(12) United States Patent
Rose et al.

(10) Patent No.: US 9,484,770 B2
(45) Date of Patent: Nov. 1, 2016

(54) SYSTEM AND METHOD OF CHARGING A CHEMICAL STORAGE DEVICE

(71) Applicant: Keme, Inc., Redwood City, CA (US)

(72) Inventors: Jeffrey Rose, Redwood City, CA (US); Jennifer Fraser, San Carlos, CA (US)

(73) Assignee: Keme, Inc., Redwood City, CA (US)

( * ) Notice: Subject to any disclaimer, the term of this patent is extended or adjusted under 35 U.S.C. 154(b) by 845 days.

(21) Appl. No.: 13/708,307

(22) Filed: Dec. 7, 2012

(65) Prior Publication Data

US 2014/0159669 A1    Jun. 12, 2014

(51) Int. Cl.
*H02J 7/00* (2006.01)
*H02J 7/04* (2006.01)
*H02J 7/02* (2016.01)
*H02J 7/06* (2006.01)

(52) U.S. Cl.
CPC .............. *H02J 7/045* (2013.01); *H02J 7/022* (2013.01); *H02J 7/06* (2013.01)

(58) Field of Classification Search
USPC ....................................................... 320/134
See application file for complete search history.

(56) References Cited

U.S. PATENT DOCUMENTS

| | | |
|---|---|---|
| 5,006,782 A | 4/1991 | Pelly |
| 6,040,684 A | 3/2000 | Mitchell |
| 6,534,955 B1 | 3/2003 | Wae |
| 6,677,730 B2 | 1/2004 | Bedini |
| 7,425,816 B2 | 9/2008 | Meyer et al. |
| 7,570,010 B2 | 8/2009 | Benckenstein, Jr. |
| 2007/0216359 A1 | 9/2007 | Arai |
| 2011/0043165 A1* | 2/2011 | Kinser .................... B60L 1/003 320/109 |
| 2011/0044077 A1* | 2/2011 | Nielsen ................... H02J 9/062 363/37 |
| 2011/0285131 A1* | 11/2011 | Kwon ....................... F03G 7/08 290/50 |

* cited by examiner

*Primary Examiner* — Robert Grant
(74) *Attorney, Agent, or Firm* — Schwegman Lundberg & Woessner, P.A.

(57) ABSTRACT

A system is provided to allow for charging of a chemical storage device without a rectifier. A gate is used in conjunction with a gate controller. The gate controller monitors input voltage and opens the gate when voltage crosses a zero crossing in a first direction. The gate monitor then closes the gate when the voltage crosses a zero crossing in a second direction. This increases the chances that the output power will have voltage in a single direction. This output power is then fed to a chemical storage device, where it can be stored and used by one or more electronic devices.

11 Claims, 19 Drawing Sheets

US 9,484,770 B2

SYSTEM AND METHOD OF CHARGING A CHEMICAL STORAGE DEVICE

TECHNICAL FIELD

This document generally relates to systems and methods for use with charging a chemical storage device.

BACKGROUND

The most common way to distribute electrical power is through the use of Alternating Current (AC). In AC power, the movement of an electrical charge changes direction back and forth. Many electronic devices, however, utilize Direct Current (DC), where the movement of electrical charge is only in one direction. The change from AC current (from, e.g., an electrical grid) to DC current (for, e.g., an electronic device) is accomplished through a process known as rectification. Rectification, however, requires the switching of gates, which creates a loss of power through resistance. Additionally, electronic devices are often sensitive to voltage abnormalities and irregularities, and therefore filtration often occurs in conjunction with rectification. The overall result is a loss of efficiency in the system and the need for additional parts, which cost money. What is needed is a cheap and more efficient solution.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a system for charging a chemical storage device is used in place of a conventional charging system, aiding in the reduction of power loss and complexity while still accomplishing the conversion. In an additional example embodiment, the system has a protection mechanism at the power input that can activate in the event of overcurrent (instantaneous or extended) and will open to prevent damage.

Typical conversion systems that transform AC voltage to DC voltage include an input rectifier and a filter taking an incoming AC sine wave and converting it to DC at line voltage. Losses through the input rectification and filter are created by the inline impedance created by the diodes, which regulate the direction of electron flow through the circuit to create DC voltage. An inverter and chopper provide additional filtration through which DC voltage is converted to higher AC voltage. Losses through the inverter and chopper are created by the switching of gates, which results in heat generation. This heat generation requires efforts to be taken to cool the system to compensate for the extra heat. This further reduces efficiency and increases cost.

An output transformer then takes the incoming high voltage AC and transforms it to the utilization voltage. Losses in the transformer are the result of impedance, which also results in additional heat generation (and adds to the heat problems described earlier). An output rectifier and filter then take the incoming AC sine wave and convert it to DC at line voltage. Losses through the output rectifier and filter are created by the inline impedance from the diodes, which regulate the electron flow through the circuit to create DC voltage. A chopper controller is used as a feedback loop to the control system.

An additional problem with typical conversion systems arises from the attempts to compensate for the aforementioned drawbacks. Specifically, in order to reduce the danger introduced by rapid heat generation (such as the chance a battery being charged by the system could explode), typical conversion systems operate a slow pace, requiring additional time to charge batteries.

Figure 1:
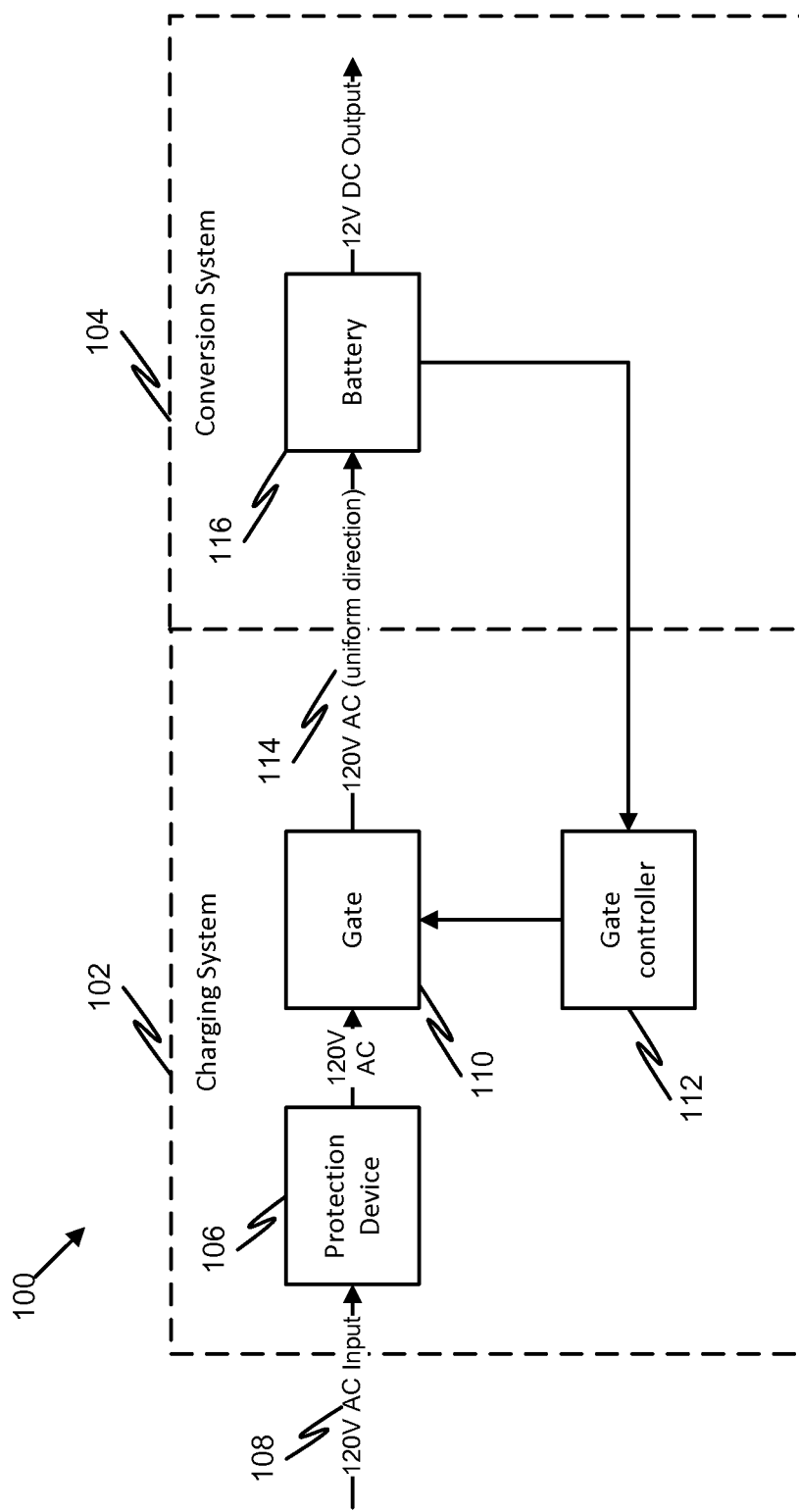
FIG. 1 is a block diagram illustrating, in accordance with an example embodiment, a system designed to convert alternating current power to direct current power.

FIG. 1 is a block diagram illustrating, in accordance with an example embodiment, a system for converting AC power to DC power. The system 100 may generally comprise two sub-systems: a charging system 102 and a conversion system 104. These sub-systems 102, 104, however, are merely designations applied to various components in the system 100, and it is not necessary that there be any physical or electrical separation between the two sub-systems 102, 104.

The charging system 102 may include a protection device 106, which accepts the AC input 108 (typically at 120V, although this is not strictly necessary). The protection device activates in the event of overcurrent (instantaneous or extended) and opens to prevent damage if that occurs.

A gate 110 works in conjunction with a gate controller 112 to open and close based on the movement direction of the AC voltage. Specifically, as will be described in more detail below, the gate controller 112 is designed to open the gate 110 when a sine wave corresponding to the AC voltage crosses above zero (i.e., becomes positive), and close the gate 110 when the sine wave crosses back across zero (i.e., becomes negative). The gate controller 112 can control the gate 110 by issuing a signal to the gate 110 when the gate 110 should open and another signal to the gate 110 when the gate 110 should close. Thus, while the system has a gate 110, it has many fewer gates than prior art conversion systems and thus is more efficient and more cost effective. In one example embodiment, the gate controller 112 may be an insulated-gate bipolar transistor.

The result is that the output 114 of the gate 110, while still technically AC, has been modified so that the current is only flowing in a uniform direction. The conversion system 104, as it is, merely contains a chemical storage device 116. The chemical storage device 116 receives the modified voltage (output 114) from the gate 110. This allows the chemical storage device 116 to accept charge at a much higher pace than prior art designs, without any accompanying heat loss. Specifically, the system 100 allows for charging the chemical storage device 116 at a ten times or higher charge rate than prior art designs.

Essentially, the system 100 described herein allows for conversion of AC to DC without rectification and with minimal heat generation and components.

It should be noted that the term "battery" as used in this document shall be interpreted broadly to cover any storage device capable of storing an electrical charge. This would include, as mentioned previously, embodiments where solar and wind array storage devices are utilized with the system, despite the fact that under some definitions of the term "battery" these storage devices may not be considered strictly "batteries." In order to more broadly cover electrical storage devices, in many places the term "chemical storage device" is used in lieu of "battery." While some in the art view "battery" as narrower than "chemical storage device," for purposes of the disclosure both terms are used in their broadest sense.

Figure 2:
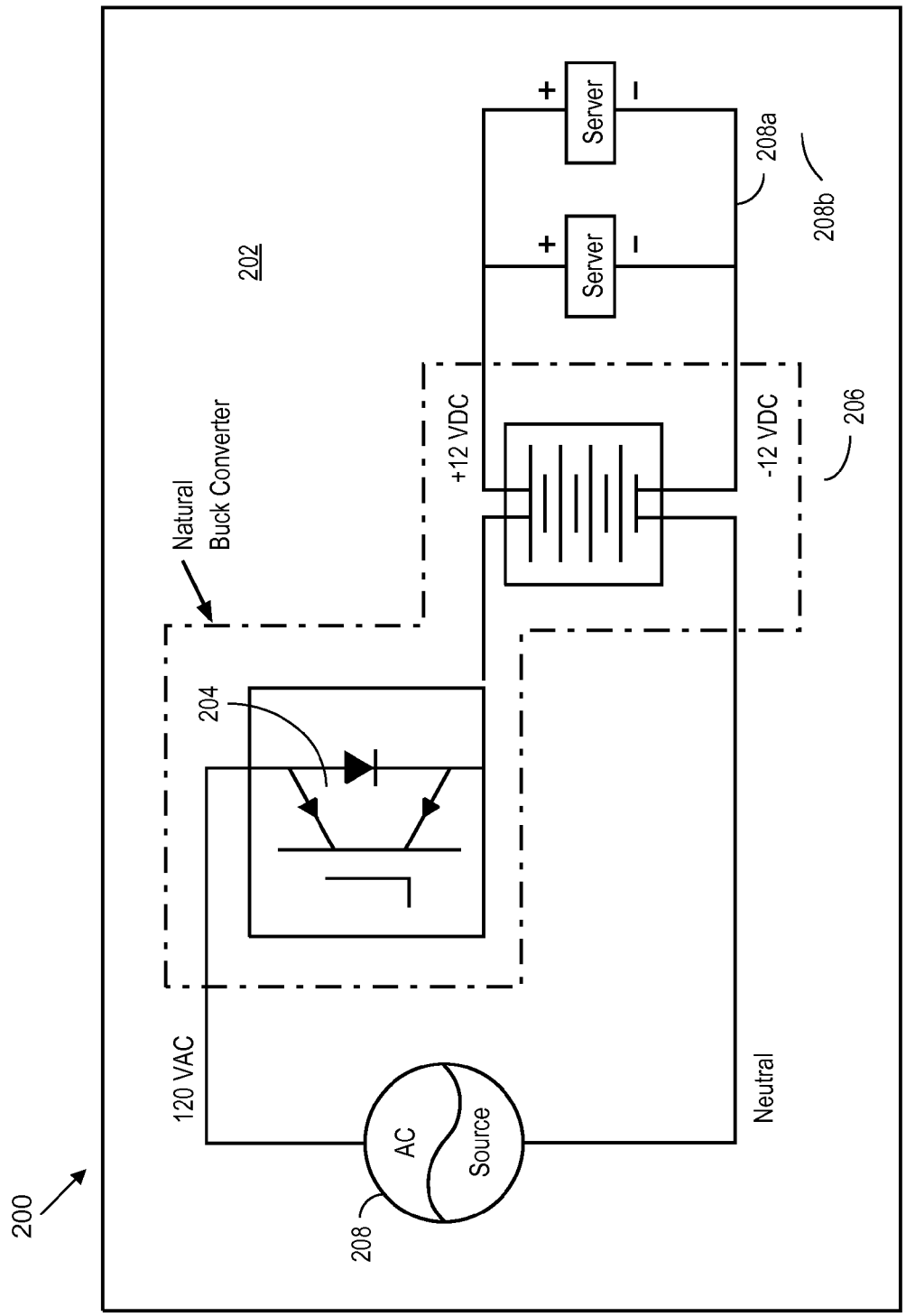
FIG. 2 is a circuit diagram illustrating, in accordance with an example embodiment, a circuit designed to convert alternating current power to direct current power.

FIG. 2 is a circuit diagram illustrating, in accordance with an example embodiment, a conversion circuit. The conversion circuit 200 includes a converter 202, including a gate 204 and a battery 206. The AC source 208 is applied to the gate 204, which is controlled as described earlier to limit the voltage applied to the battery 206 to only current moving in one direction. Also depicted here are servers 208a, 208b, which are coupled to the battery 206 and draw on the power from the battery 206 to operate. Of course, as will be described in more detail later, there is no necessity that servers 208a, 208b be used, and any electronic device could be potentially powered by the battery 206 in this system.

Figure 3:
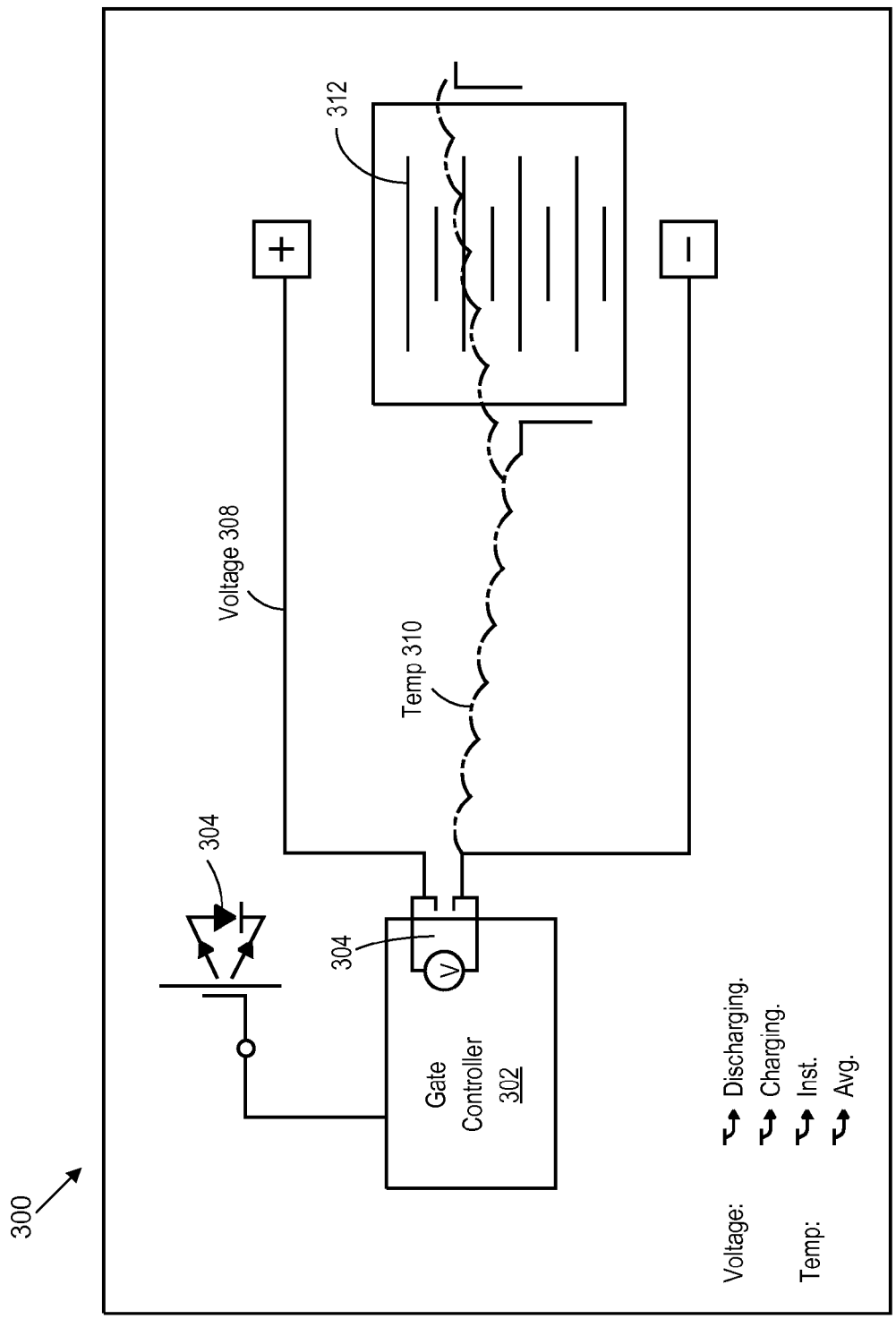
FIG. 3 is a circuit diagram illustrating, in accordance with an example embodiment, a feedback loop.

FIG. 3 is a circuit diagram illustrating, in accordance with an example embodiment, a feedback loop. The feedback loop 300 includes a gate controller 302 coupled to the gate 304. This gate 304 may be, for example, the gate depicted in FIG. 2, although it is not strictly necessary. The gate controller 302 may include a feedback monitor 306 that monitors voltage 308 and temperature 310 of the battery 312. Again, this battery 312 may be the battery of FIG. 2, although it is not strictly necessary. As the voltage passes over the zero crossing, the gate controller 302 signals the gate 304 to open or close, depending on the direction of the crossing. As the temperature reaches an instantaneous or average temperature exceeding a preset threshold, a signal may be sent to a protection circuit to stop the input voltage entirely.

It should be noted that while in some embodiments a separate protection circuit or protection device may be utilized, in other embodiments the addition of such a separate circuit or device may be unnecessary. Specifically, the gate 304 could be used as a protection device. In such embodiments, the gate controller 302 may open or close the gate 304 when zero crossings occur, but may also simply close the gate when temperature measurements exceed the predetermined thresholds.

Figure 4:
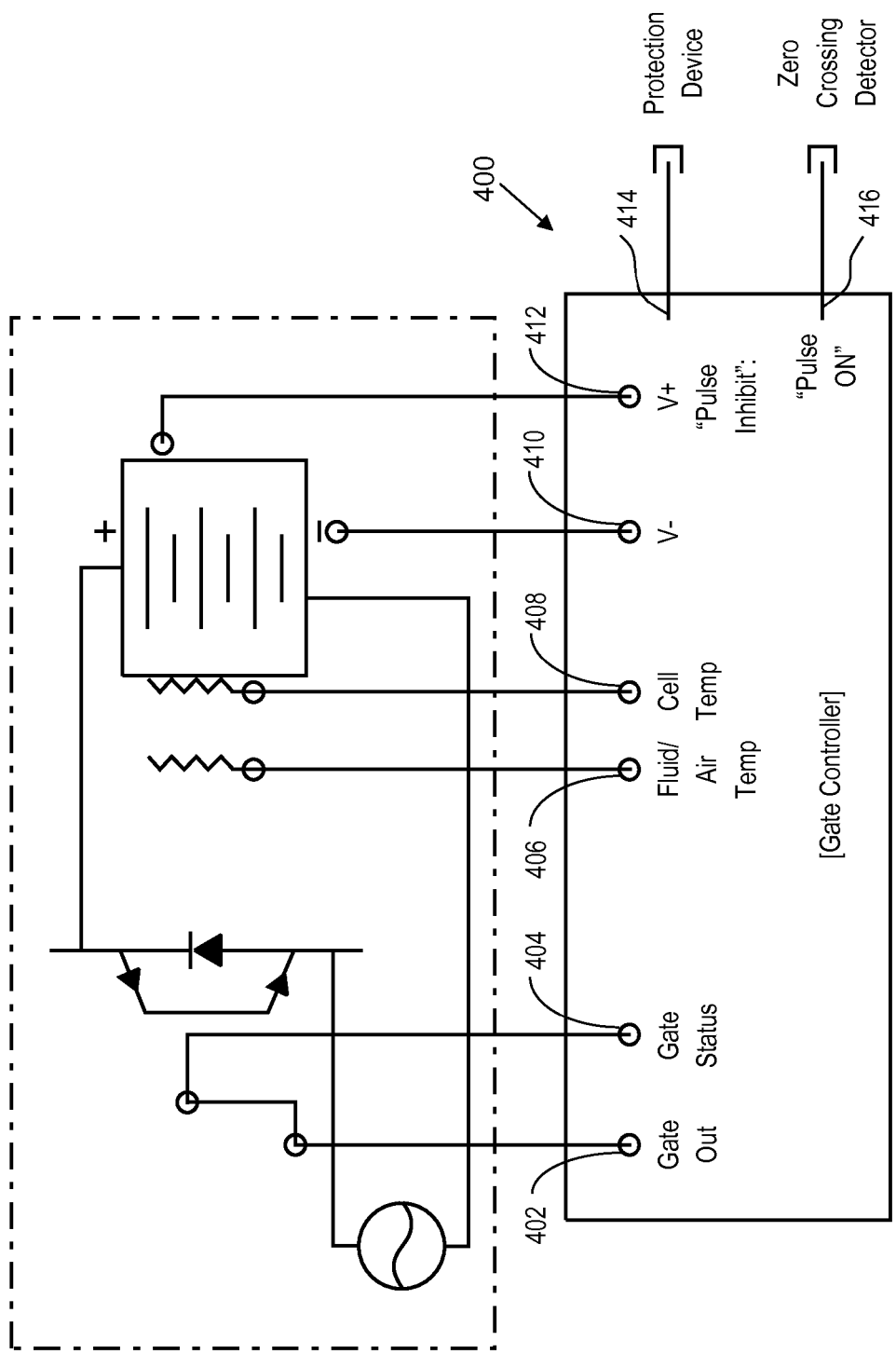
FIG. 4 is a circuit diagram illustrating, in accordance with an example embodiment, a gate controller.

FIG. 4 is a circuit diagram illustrating, in accordance with an example embodiment, a gate controller. The gate controller 400 includes a series of input/output lines, including a gate out 402, a gate status 404, a fluid/air temperature 406, a cell temperature 408, a negative voltage 410, a positive voltage 412, a line to a protection device 414, and a line to a zero crossing detector 416. The gate out 402 controls the opening and closing of the gate, with gate status 404 providing a current status of the gate (opened or closed). The fluid/air temperature 406 receives information from a sensor 418 indicating the temperature of the fluid or air surrounding a battery 420, while a cell temperature 408 receives information from a sensor 422 indicating the temperature of the cell of the battery 420. The positive voltage 412 acts to inhibit pulses when activated.

Figure 5:
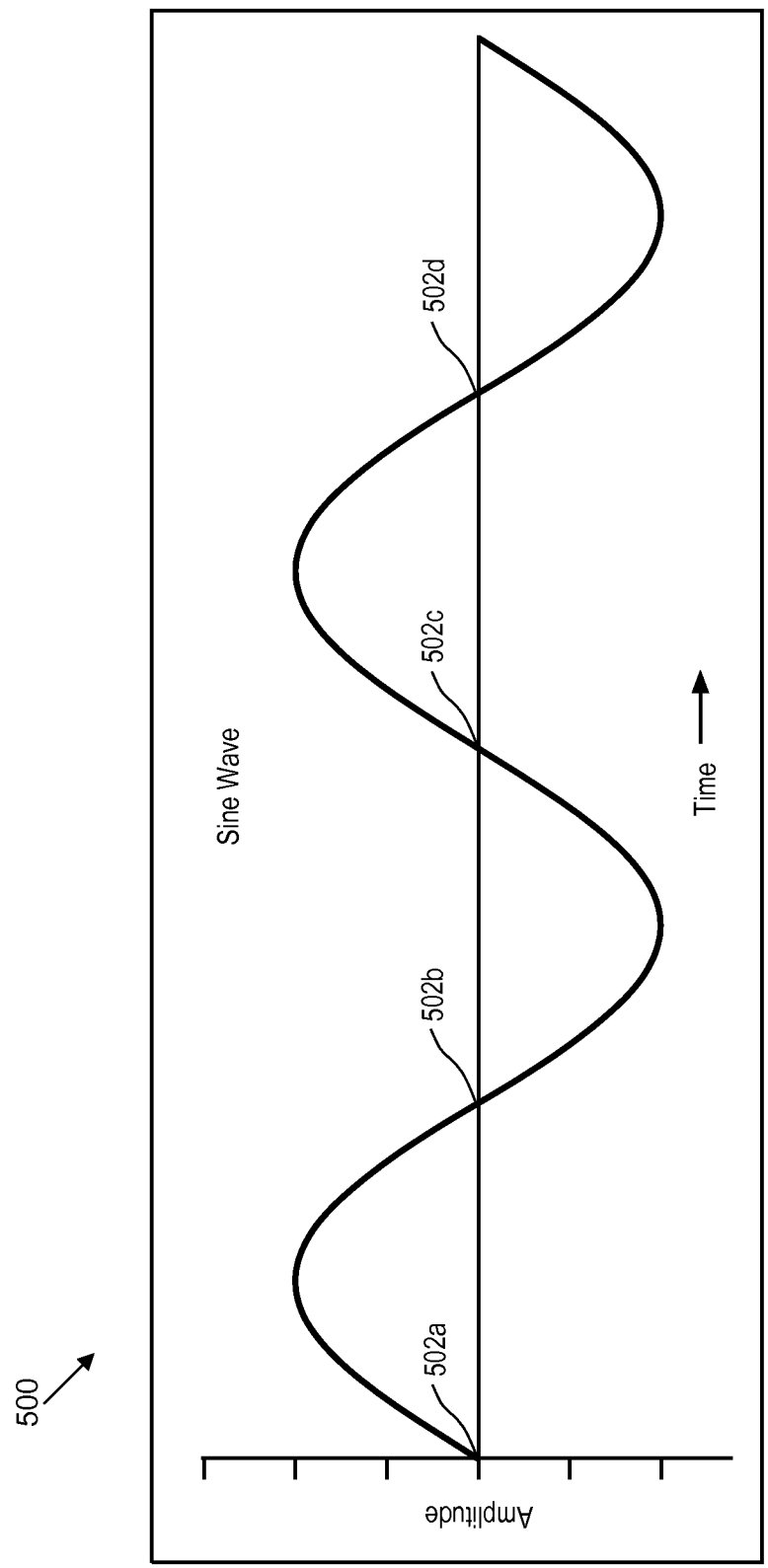
FIG. 5 is a diagram illustrating, in accordance with an example embodiment, a sine wave of input voltage.

FIG. 5 is a diagram illustrating, in accordance with an example embodiment, a sine wave of input voltage. The sine wave 500 includes various zero crossings 502a, 502b, 502c, 502d. As can be seen, the gate controller may be designed to open the gate at zero crossings 502a, 502c where the transition is from negative to positive, and to close the gate at zero crossings 502b, 502d where the transition is from positive to negative. A zero crossing 502a, 502b, 502c, 502d is defined as a point where no voltage is present.

It should be noted that in some example embodiments the system may be configured to operate at opposite voltages. For example, the gate may be open when a zero crossing occurs from positive to negative voltage, whereas the gate may be closed when a zero crossing occurs from negative to positive voltage. In such instances, it still may be beneficial to name the zero crossing a positive zero crossing, even though the voltage crosses from positive to negative, as the "positive" term implies that action should be taken (e.g., opening the gate). As such, the terms "positive zero crossing" and "negative zero crossing" should not be viewed as being limited to any particular embodiment or direction of crossing.

The system can be designed to provide power at regular, preprogrammed intervals. As such, the gate may be opened and closed many times while the voltage is positive, even when no zero crossing is occurring.

The intervals may be based on known parameters of the battery chemistry as well as on system monitoring and controls. As the sine wave diverges and approaches a zero crossing, the amplitude of the voltage is at its lowest value. As a result, it is not strictly necessary to detect a zero crossing with a high degree of accuracy. Nevertheless, steps may be taken to verify that, prior to the commencement of the pulse to open the gate, the sine wave is on the top half of the cycle. A time delay can be introduced immediately following a positive zero crossing detection (i.e., a zero crossing where the transition is from negative to positive). This helps reduce the chance that the gate may be opened too early due to the positive zero crossing being detected too early.

Subsequently, when the sine wave falls towards a negative zero crossing (i.e., a zero crossing where the transition is from positive to negative), a low-end threshold can be used to ensure that the gate is closed prior to the negative zero crossing. In an example embodiment, a negative zero crossing is assumed when the voltage drops to 5-10% of the peak voltage.

Notably, the system is able to charge the chemical storage device (and convert AC power to DC power) without rectification. No diodes, for example, lie between the AC power source and the chemical storage device.

Figure 6:
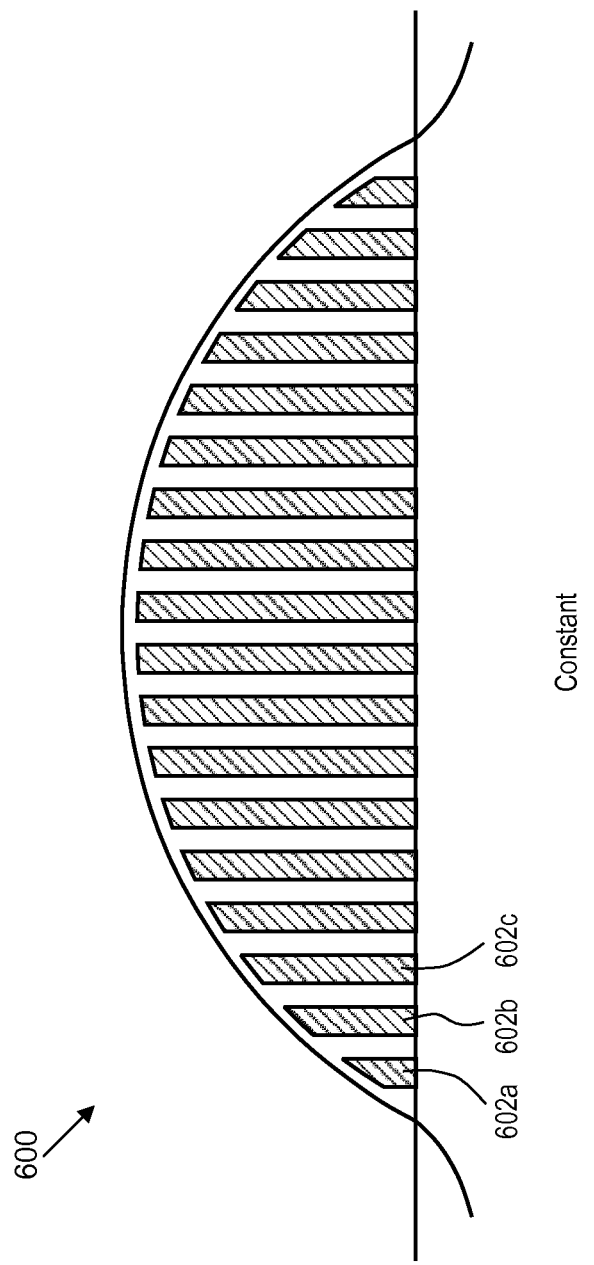
FIG. 6 illustrates a constant width pulse modulation scheme in accordance with an example embodiment.
Figure 7:
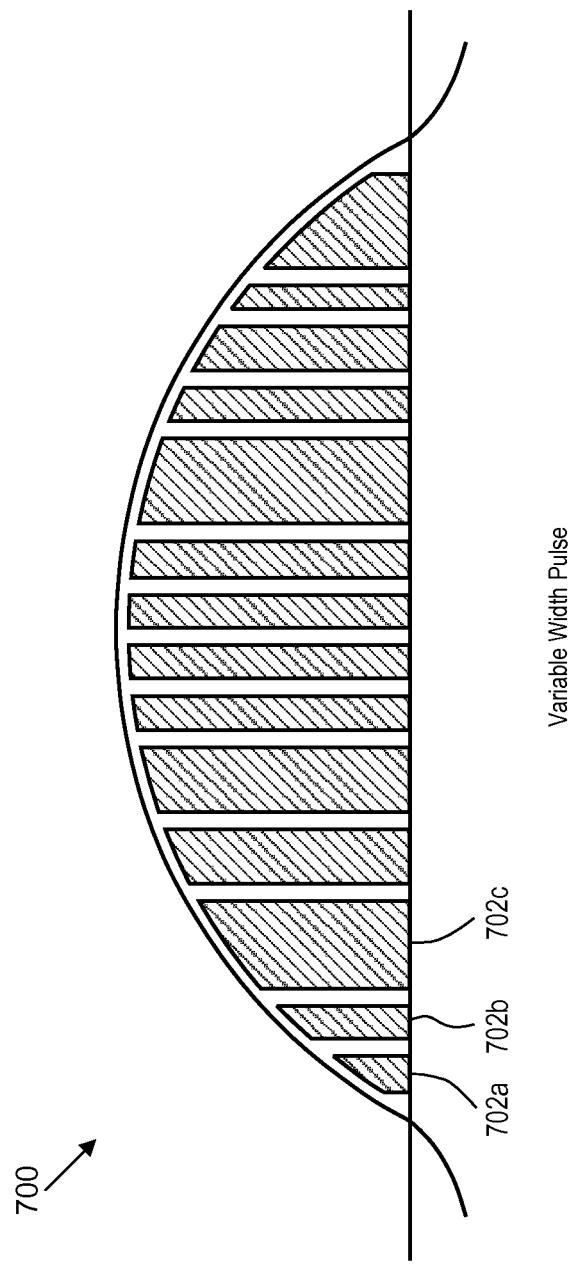
FIG. 7 illustrates a variable width pulse modulation scheme in accordance with an example embodiment.
Figure 8:
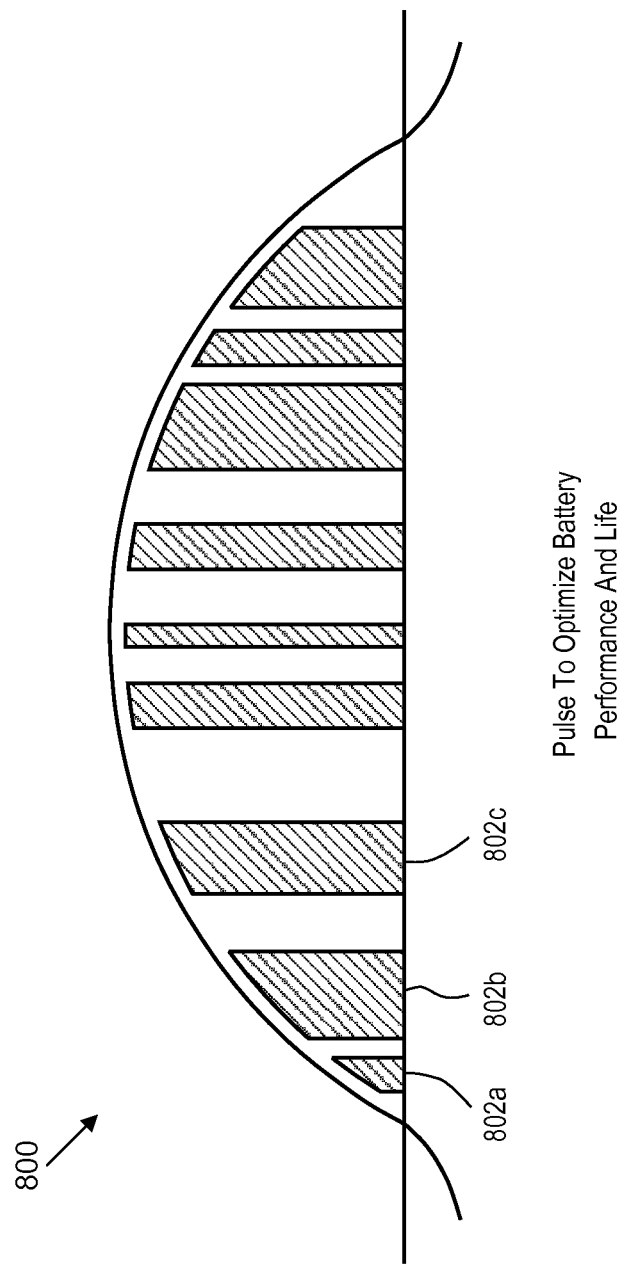
FIG. 8 illustrates a variable width pulse modulation scheme in accordance with an another example embodiment.

Various different pulse modulation schemes can be utilized. In some example embodiments, these schemes are used to correlate the system with the duty cycle of the chemical storage device. In some instances, the amplitude of the AC is higher than the rating of the battery. In such cases, it may be preferable to cycle the power on and off to reduce the load on the chemical storage device, even when the chemical storage device is in a "charging" state. FIGS. 6-8 depict examples of different schemes. FIG. 6 illustrates a constant width pulse modulation scheme, in accordance with an example embodiment. Here, the graph 600 depicts pulses (e.g., 602a, 602b, 602c) that are of a constant width. The shaded areas reflect times when the gate is open, whereas the non-shaded areas reflect times when the gate is closed.

FIG. 7 illustrates a variable width pulse modulation scheme, in accordance with an example embodiment. In order to optimize the charging of the system, the system can be designed to use feedback from the battery monitoring to modulate the width of charge duration to minimize time for charging. As can be seen, the graph 700 depicts pulses (e.g., 702a, 702b, 702c) having variable widths.

FIG. 8 illustrates a variable width pulse modulation scheme, in accordance with an another example embodiment. Here, information on cell chemistry can be used to optimize the width of pulsing for battery performance and life, as opposed to minimizing time for charging as in FIG. 7. The graph 800 depicts pulses (e.g., 802a, 802b, 802c) having variable widths, but optimized for battery performance and life.

Figure 9:
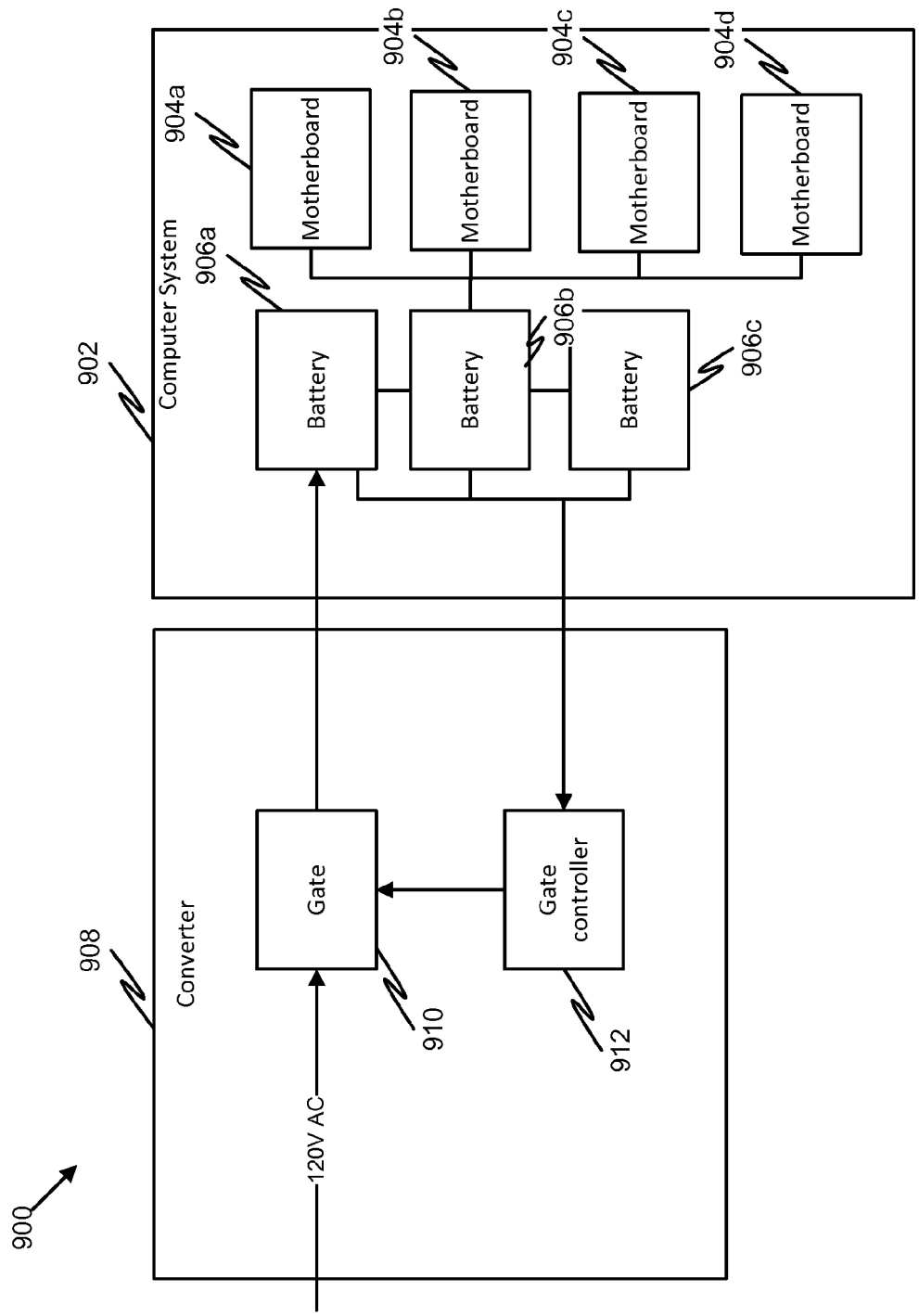
FIG. 9 is a diagram illustrating a system, in accordance with an example embodiment, including a conversion circuit.

The system can be applied to a variety of different architectures in order to provide reliable and efficient DC power from an AC power source. In one example, a system can attached to an individual electronic device, such as a computer system. FIG. 9 is a diagram illustrating a system, in accordance with an example embodiment. The system 900 includes a computer system 902 having a plurality of motherboards 904a-904d and a plurality of batteries 906a-906c. A converter 908, including a gate 910 and a gate controller 912 can be attached to the computer system 902 to cause the charging of batteries 906a-906c.

Figure 10:
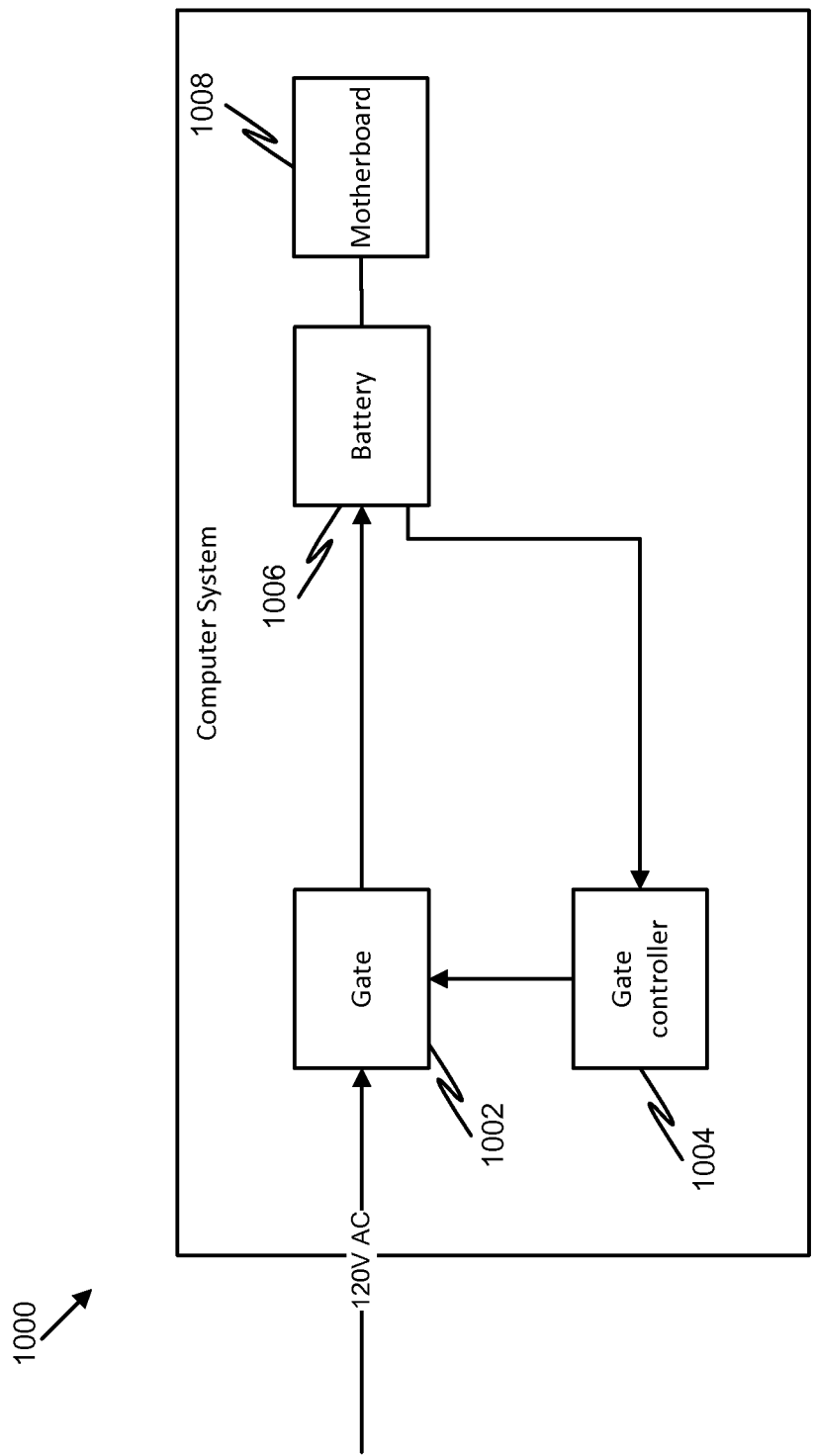
FIG. 10 is a diagram illustrating a system, in accordance with another example embodiment, including a conversion circuit.

In another example, the system can be embedded in an individual electronic device, such as a computer system. FIG. 10 is a diagram illustrating a system, in accordance with another example embodiment. Here, the system 1000 may include the converter, including the gate 1002 and gate controller 1004, in addition to having a motherboard 1006 and a battery 1008. Of course, a computer system is only one example of an electronic device that can utilize the system. Other electronics, such as televisions, phones, and the like, can also utilize such a system.

Figure 11:
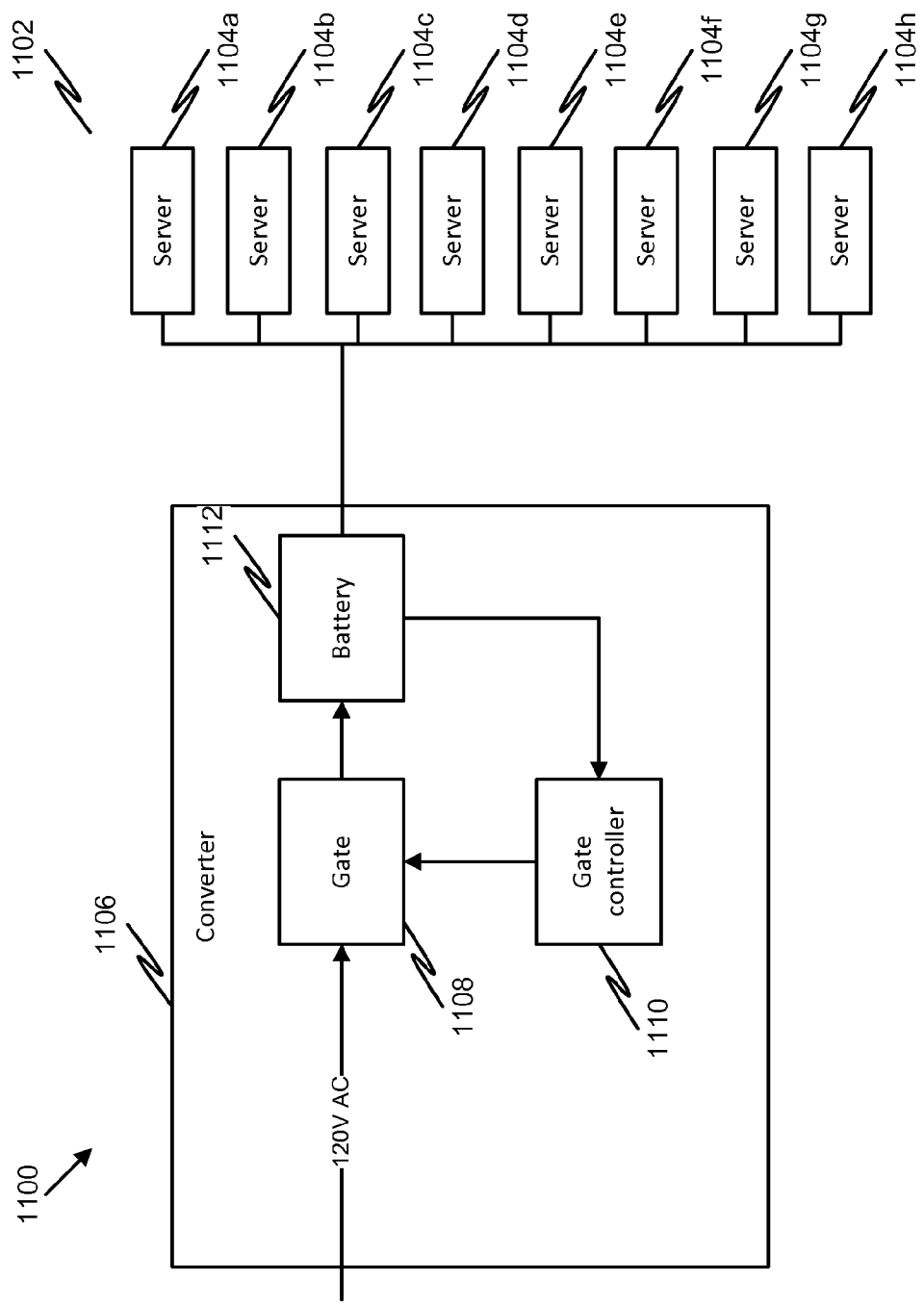
FIG. 11 is a diagram illustrating a system, in accordance with an example embodiment, including a server farm.

Banks of electronics, such as server farms, can also utilize the system. FIG. 11 is a diagram illustrating a system, in accordance with an example embodiment, including a server farm. Here, the system 1100 has a server farm 1102 with a plurality of servers 1104a-1104h. Each of the servers 1104a-1104h can be coupled to a single converter 1106 including a single gate 1108, gate controller 1110, and battery 1112.

Including servers in a system allows for increased efficiencies that may not be available in non-server embodiments. When a converter is used to power a server, the volatile memory (e.g., Random Access Memory (RAM)) of the server is essentially turned into non-volatile memory. Additionally, servers are capable of transferring workload to other servers. As such, an increased flexibility is realized through the use of the converter with servers in that one or more of the servers could transfer its workload to other servers and essentially operate as a power distributor or generator for the other servers.

The converter can also be centralized to a building, campus, or other large system to serve individual electronic components, assembled systems, and used as a distribution system for power.

Figure 12:
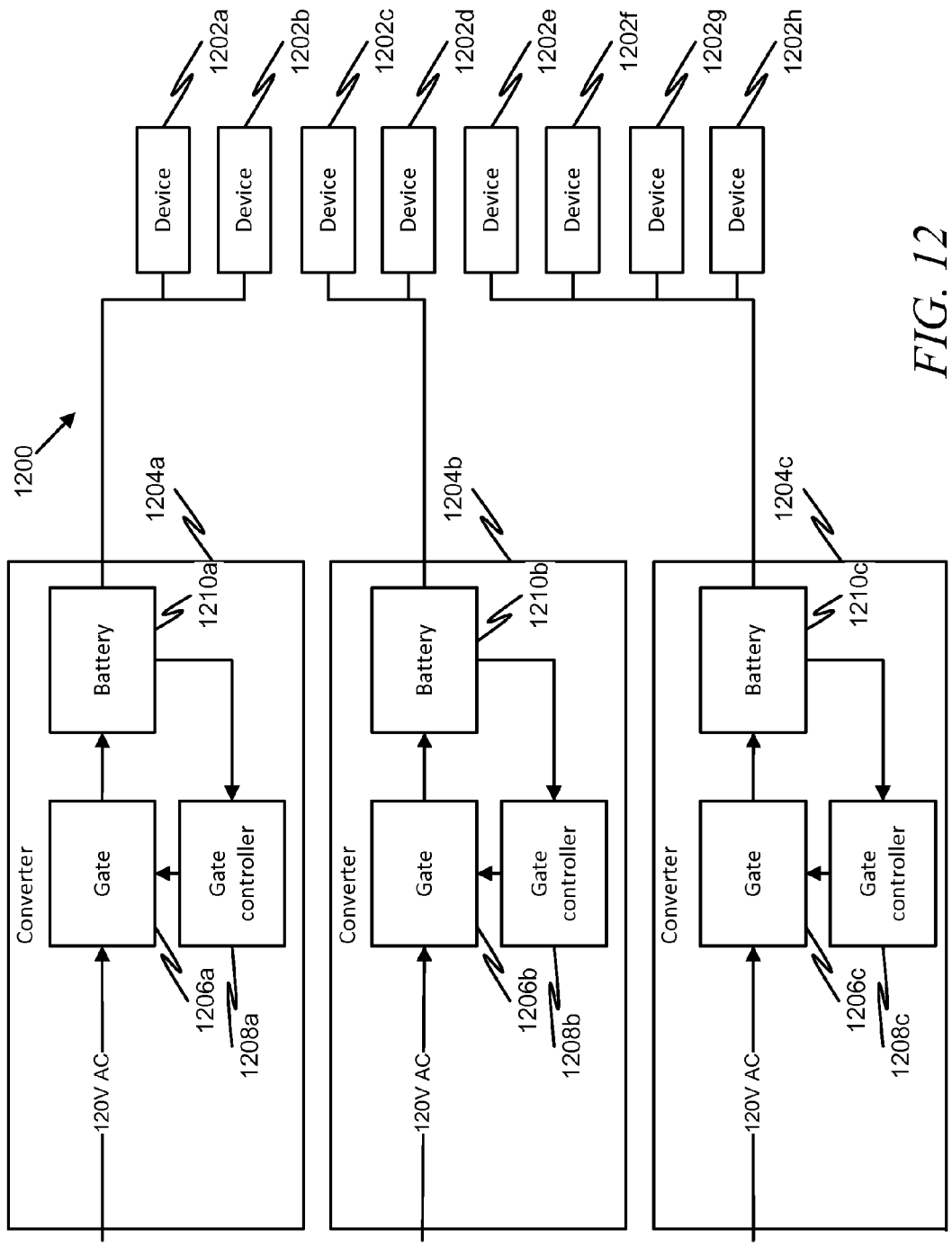
FIG. 12 is a diagram illustrating a system, in accordance with an example embodiment, having a plurality of conversion circuits.

In some instances it may be beneficial to provide a variety of different DC voltages to a system. For example, if the system includes servers that require different levels of voltage, it may be beneficial to provide a system to provide such a variety of voltages. FIG. 12 is a diagram illustrating a system, in accordance with an example embodiment, providing multiple voltages. Here, the system 1200 may include a plurality of different electronic devices 1202a-1202h. In this example, devices 1202a-1202b require 12V DC, devices 1202c-1202d require 14.4V DC, and devices 1202e-1202h require 18V DC. Thus, three different converters 1204a-1204c are provided, each with their own gates 1206a-1206c, gate controllers 1208a-1208c, and batteries 1210a-1210c. Each converter 1204a-1204c outputs a different DC voltage.

Figure 13:
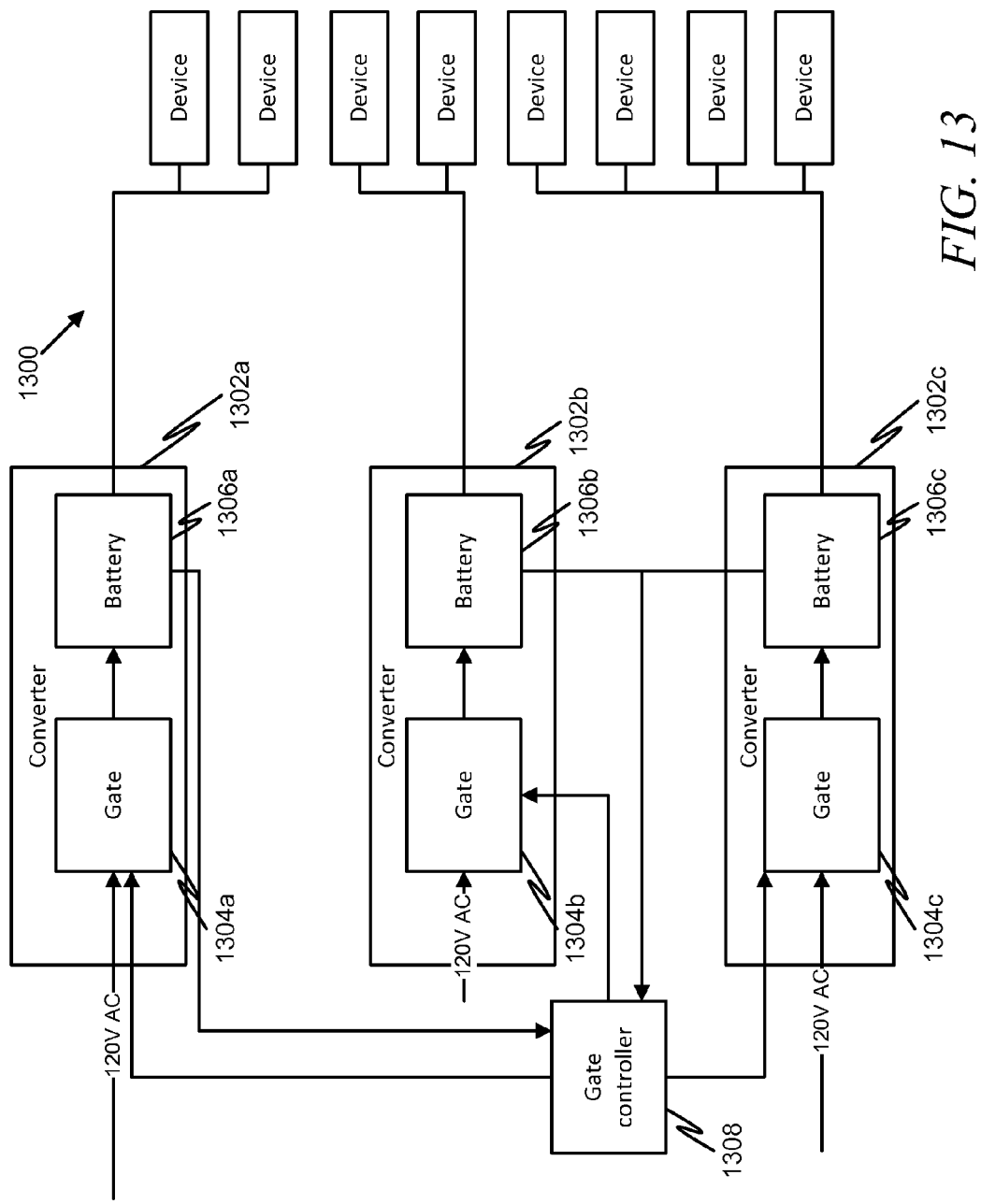
FIG. 13 is a diagram illustrating a system, in accordance with another example embodiment, having a plurality of conversion circuits.

FIG. 13 is a diagram illustrating a system, in accordance with another example embodiment, having a plurality of converters. Here, the system 1300 may include three different converters 1302a-1302c; however, while each has their own gate 1304a-1304c and battery 1306a-1306c, a single gate controller 1308 is shared among the different converters 1302a-1302c. The gate controller 1308 is designed to control the different gates 1304a-1304c in the different converters 1302a-1302c. Each converter 1302a-1302c still outputs a different DC voltage, despite the fact that one gate controller is used.

It should be noted that there is no requirement that the multiple converters all act in the same manner. Specifically, embodiments are foreseen wherein some of the converters in a larger system will open the gate when voltage crosses from negative to positive, while others of the converters in the larger system will do the opposite: open the gate when voltage crosses from positive to negative. In such instances, the separate batteries coupled to these separate converters may be designed to accept the corresponding power.

While in some embodiments the battery or batteries to be charged are permanently or semi-permanently attached to the converter, in other embodiments the battery or batteries may only be connected periodically, such as when a device needs to be charged. Examples include laptop devices, smartphones, and electric vehicles, among others. There is no requirement that the battery be permanently or semi-permanently attached to the converter. Embodiments are also possible where portions of the system (such as a gate and/or gate controller) are located on the electronic device.

The converter can also be applied to embodiments where individual batteries or battery cells are acting collectively as a generator. This may include, for example, wind farms, solar farms, and electric vehicle charging stations, among others.

As described earlier, the system allows for the conversion of AC to DC without the use of a rectifier. In essence, the battery acts as a portion of a converter.

Figure 14:
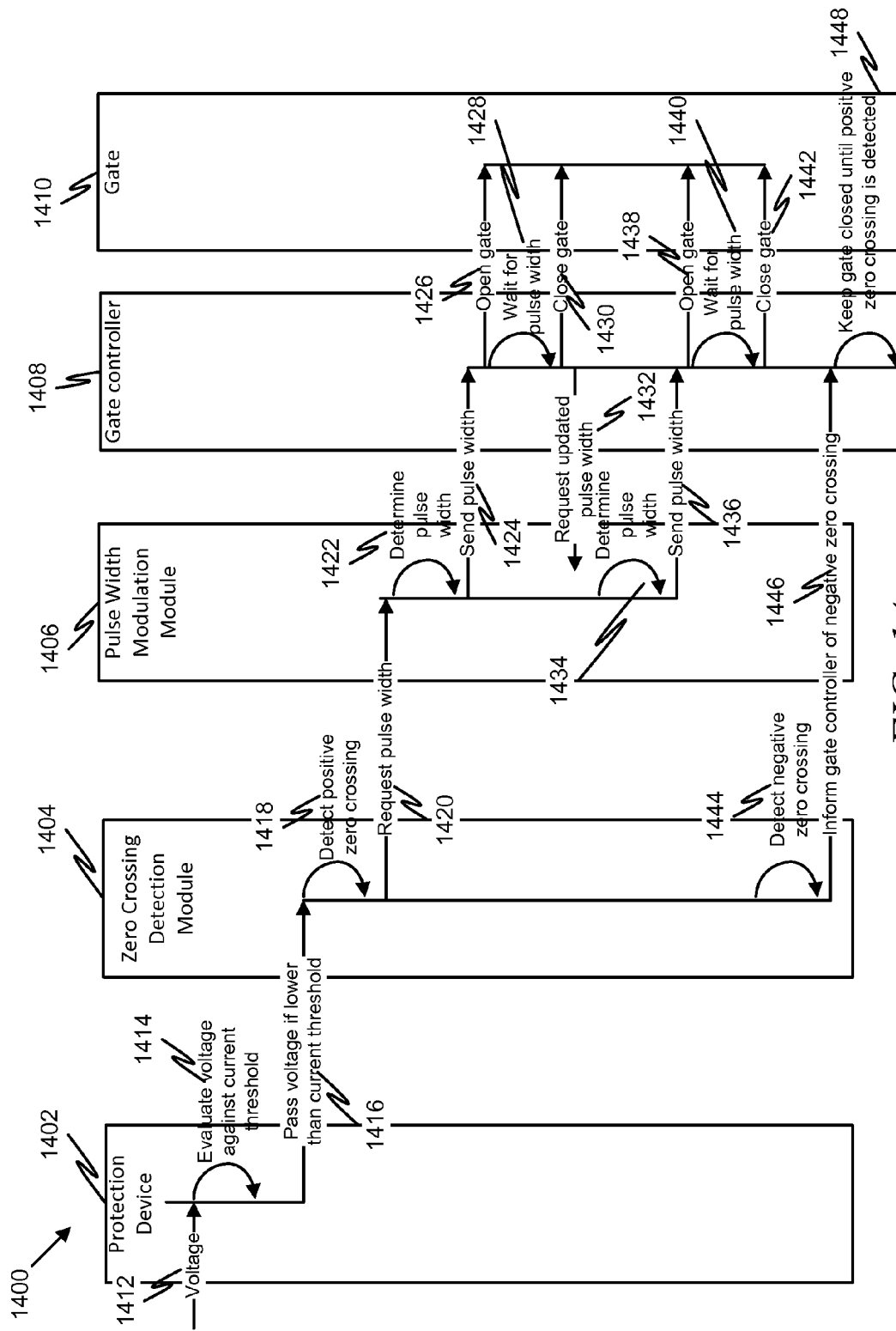
FIG. 14 is an interaction diagram illustrating a method, in accordance with an example embodiment, of converting AC to DC.

FIG. 14 is an interaction diagram illustrating a method, in accordance with an example embodiment, of converting AC to DC. The method 1400 may be operated on a series of components, including a protection device 1402, a zero crossing detection module 1404, a pulse width modulation module 1406, a gate controller 1408, and a gate 1410. At 1412, voltage is received by the protection device 1402. At 1414, the protection device 1402 may evaluate the voltage against a current threshold. If the voltage is less than a current threshold, then at 1416, the voltage is passed to the zero crossing detection module 1404. At 1418, the zero crossing detection module may detect a positive zero crossing. In response to this, at 1420, the zero crossing detection module 1404 may send a signal to the pulse width modulation module 1406 requesting a pulse width. At 1422, the pulse width modulation module 1406 may determine the pulse width. This may be accomplished by, for example, examining battery parameters. The embodiment of FIG. 14 depicts what may be a variable pulse width modulation scheme, as the pulse width may change from pulse to pulse. At 1424, the pulse width modulation module 1406 may send the pulse width to the gate controller 1408. At 1426, the gate controller 1408 may then send an open gate signal to the gate 1410. At 1428, the gate controller 1408 may wait for a time equal to the pulse width, and then at 1430 send a close gate signal to the gate 1410. At this point, the gate controller 1408 may request an updated pulse width from the pulse width modulation module at 1432. Of course, just because this is a variable pulse width modulation scheme, that does not mean that there is a requirement that the pulse width be specifically requested before each pulse. It is possible that the variable scheme may be established ahead of time and passed to the gate controller 1408 once.

At 1434, the pulse width modulation module 1406 may determine a new pulse width. At 1436, this new pulse width is sent to the gate controller 1408. At 1438, the gate controller 1408 may send an open gate signal to the gate 1410. At 1440, the gate controller 1408 may wait for a time equal to the new pulse width, and then at 1442 send a close gate signal to the gate 1410.

Figure 15:
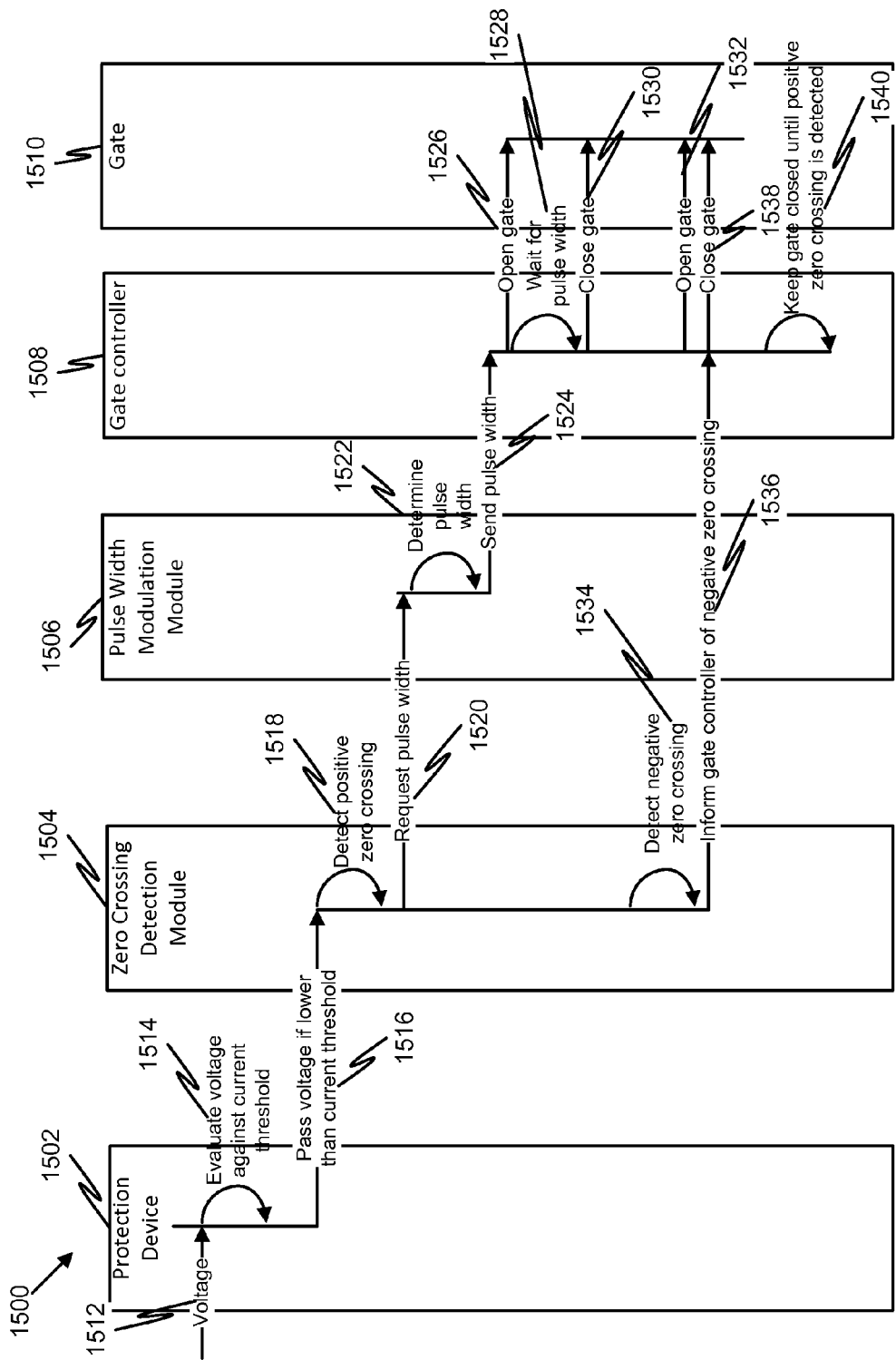
FIG. 15 is an interaction diagram illustrating a method, in accordance with another example embodiment, of converting AC to DC.

At some point later, the zero crossing detection module 1404 may detect a negative zero crossing at 1444. At 1446, the zero crossing detection module 1404 may inform the gate controller 1408 of this negative zero crossing. At that point, at 1448, the gate controller 1408 may keep the gate closed until a positive zero crossing is detected (i.e., no pulsing). It should be noted that this diagram depicts a case where the negative zero crossing is detected after two pulses, and after the second pulse has completed. In reality, the negative zero crossing may be encountered at any point, regardless of how many pulses have occurred or what stage the pulse is in. If this occurs in the middle of a pulse (i.e., when the gate 1410 is open), the gate 1410 will automatically close. If this occurs between pulses, the gate will remain closed. FIG. 15 will depict a case where the negative zero crossing occurs during a pulse.

FIG. 15 is an interaction diagram illustrating a method, in accordance with another example embodiment, of converting AC to DC. The method 1500 may operate on a series of components, including a protection device 1502, a zero crossing detection module 1504, a pulse width modulation module 1506, a gate controller 1508, and a gate 1510. At 1512, voltage is received by the protection device 1502. At 1514, the protection device 1502 may evaluate the voltage against a current threshold. If the voltage is less than a current threshold, then at 1516, the voltage is passed to the zero crossing detection module 1504. At 1518, the zero crossing detection module may detect a positive zero crossing. In response to this, at 1520, the zero crossing detection module 1504 may send a signal to the pulse width modulation module 1506 requesting a pulse width. At 1522, the pulse width modulation module 1506 may determine the pulse width. This may be accomplished by, for example, examining battery parameters or by using a preset value. The embodiment of FIG. 15 depicts a constant pulse width modulation scheme, as the pulse width does not change from pulse to pulse. As such, there is no need to recalculate the pulse width. At 1524, the pulse width modulation module 1506 may send the pulse width to the gate controller 1508. At 1526, the gate controller 1508 may then send an open gate signal to the gate 1510. At 1528, the gate controller 1508 may wait for a time equal to the pulse width, and then at 1530 send a close gate signal to the gate 1510. At 1532, the gate controller 1508 may send another open gate signal to the gate 1510.

At some point later, the zero crossing detection module 1504 may detect a negative zero crossing at 1534. At 1536, the zero crossing detection module 1504 may inform the gate controller 1508 of this negative zero crossing. At that point, at 1538, the gate controller 1508 may close the gate immediately, despite the fact that the latest pulse has not completed. At 1540, the gate 1510 may be left closed, until a positive zero crossing is detected.

Figure 16:
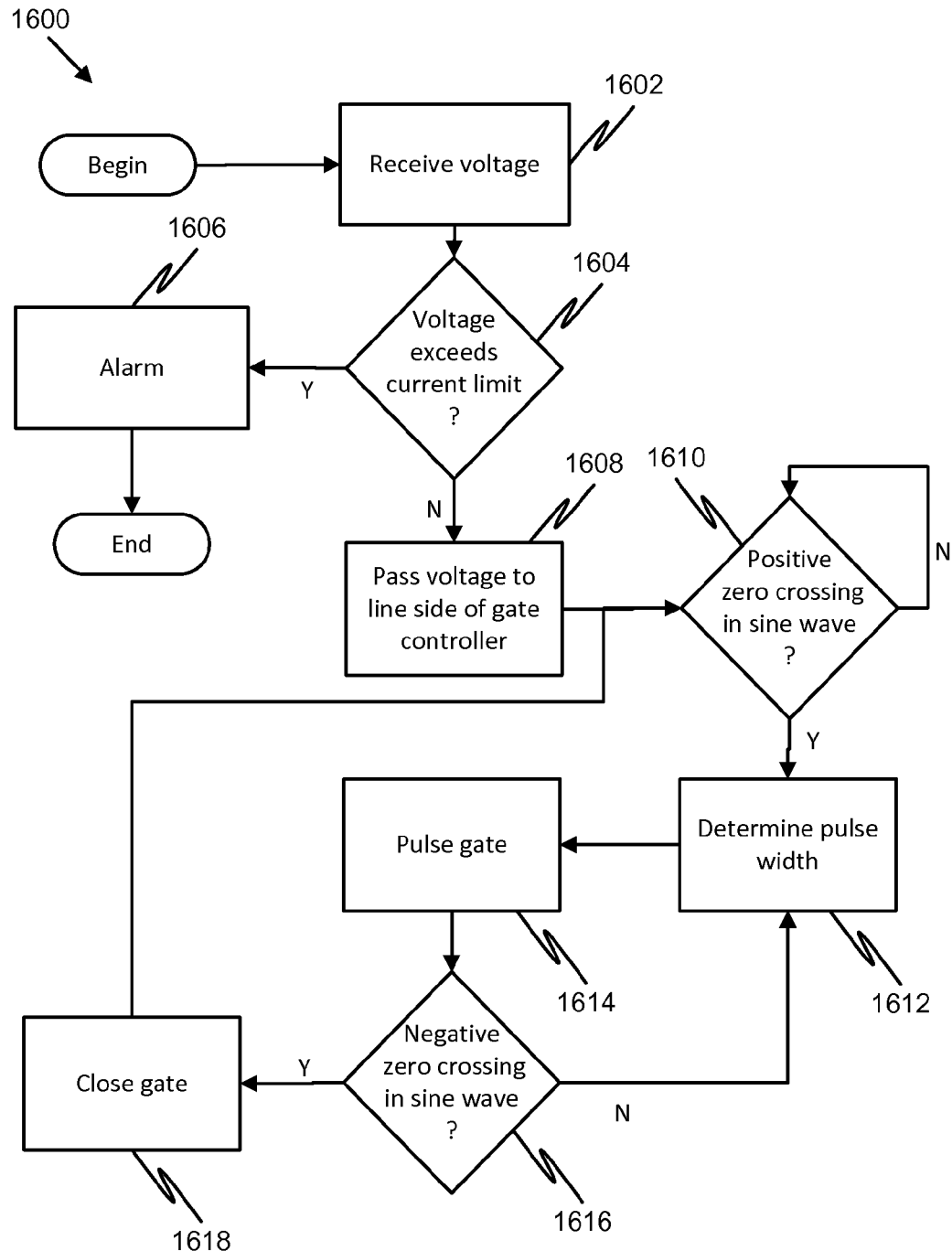
FIG. 16 is a flow diagram illustrating a method, in accordance with an example embodiment, of converting AC to DC.

FIG. 16 is a flow diagram illustrating a method, in accordance with an example embodiment, of converting AC to DC. This method 1600 may be run by, for example, a system designed to convert AC to DC. At 1602, voltage enters the system. At 1604, a protection device evaluates the incoming voltage against an current limit. If the incoming voltage is higher than the current limit, then at 1606 an alarm is generated and the process ends. At 1608, assuming the voltage is less than the established current limit, the voltage is allowed to pass to the line side of the gate controller. At 1610, the sine wave of the voltage is examined to locate a positive zero crossing. When a positive zero crossing occurs, at 1612, parameters of the battery and system can be examined to determined a duration of a pulse. At 1614, the gate is pulsed in accordance with the determined width. At 1616, it is determined if a negative zero crossing is occurring. If not, then the process may repeat at 1612. Thus, the pulsing continues until the negative zero crossing is detected. This embodiment depicts a variable pulse width modulation scheme. A constant pulse width modulation scheme is possible simply by having the process repeat to 1614 instead of to 1612, after 1616.

Once the negative zero crossing is detected, the gate is closed at 1618 and the process repeats to operation 1610.

Figure 17:
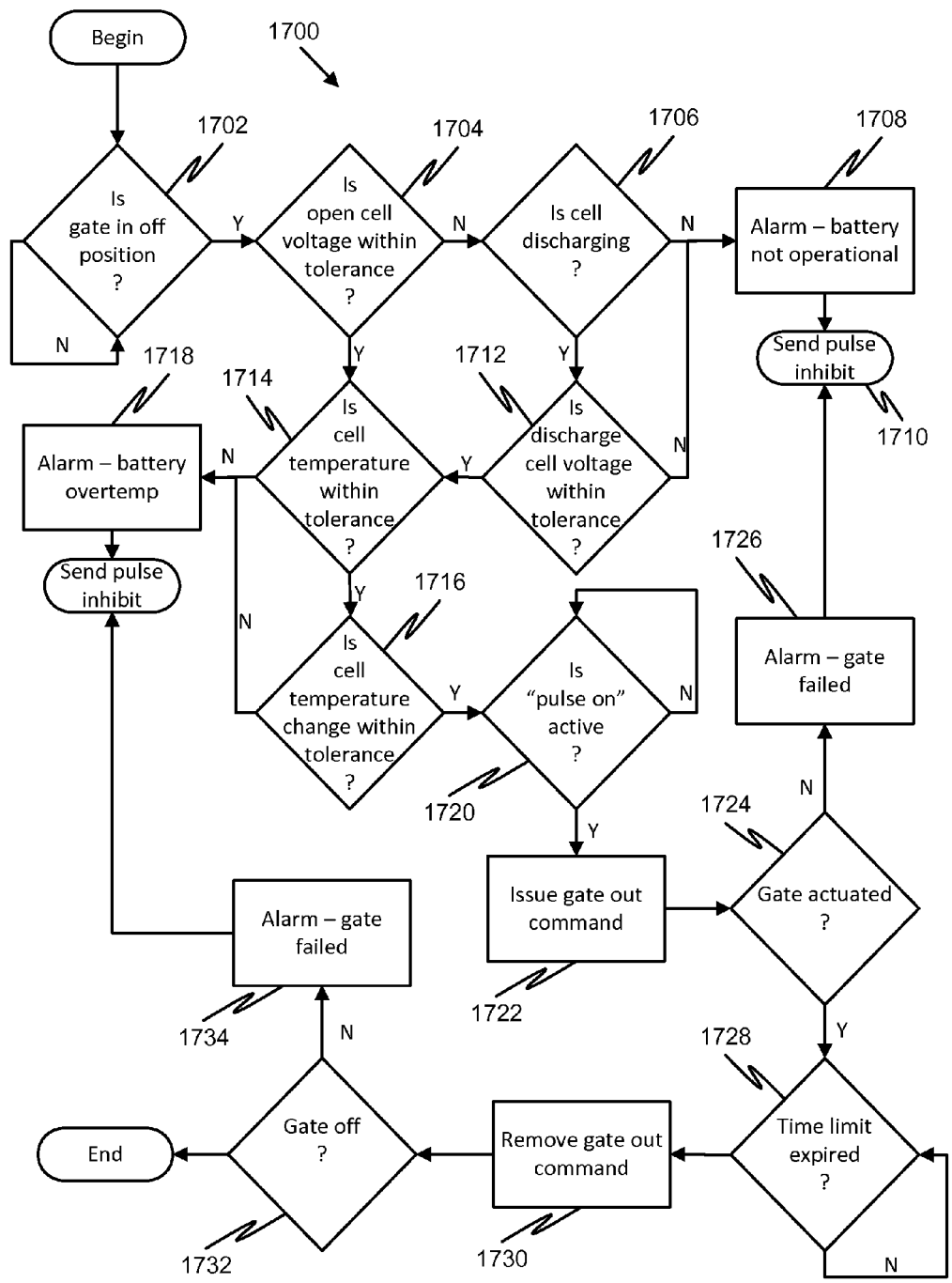
FIG. 17 is a flow diagram illustrating a method, in accordance with an example embodiment, of controlling a gate in conversion circuit.

FIG. 17 is a flow diagram illustrating a method, in accordance with an example embodiment, of controlling a gate in a system. The method 1700 is performed while the gate is in the off position. As such, at 1702, it is first verified that the gate is in the off position. Once it is in the off position, at 1704, it is determined if the open cell voltage of the battery is within a preset tolerance level. If not, then at 1706, it is determined if the cell is discharging. If not, then an alarm is generated at 1708 indicating that the battery is not operational. It should be noted that, if such an alarm is generated, then at 1710 a pulse inhibit signal is sent preventing use of the system until a reset is performed. If the cell is discharging, then at 1712 it is determined if the discharge cell voltage is within tolerance. If not, then the alarm is generated at 1708 indicating that the battery is not operational.

If, at 1704, it was determined that the open cell voltage was within tolerance, or if, at 1712, it was determined that the discharge cell voltage was within tolerance, then, at 1714, it is determined if the cell temperature is within tolerance. If so, then, at 1716, it is determined whether the change in temperature has exceeded a tolerance limit for temperature change. If either of these conditions occur, then, at 1718, an alarm is generated that the battery is too hot (overtemp). If not, then, at 1720, it is determined if a "pulse on" signal is active. The "pulse on" signal may be generated by a pulse width modulation module indicating times when a gate should be opened. If it is active, then, at 1722, a gate out command is issued, which opens the gate. At 1724, it may be determined if the gate has actually actuated (opened). If not, then, at 1726, an alarm is generated indicating that the gate has failed, and a pulse to inhibit the system is generated. Otherwise, at 1728, the system may wait for a time limit to expire. The time limit may be set by the pulse width modulation module and may indicate the length of the pulse. When the time limit expires, at 1730 the gate out command may be removed. At 1732 the system may verify that the gate is in fact off. If not, then an alarm may be generated that the gate has failed at 1734, and a pulse inhibit signal may be generated.

Figure 18:
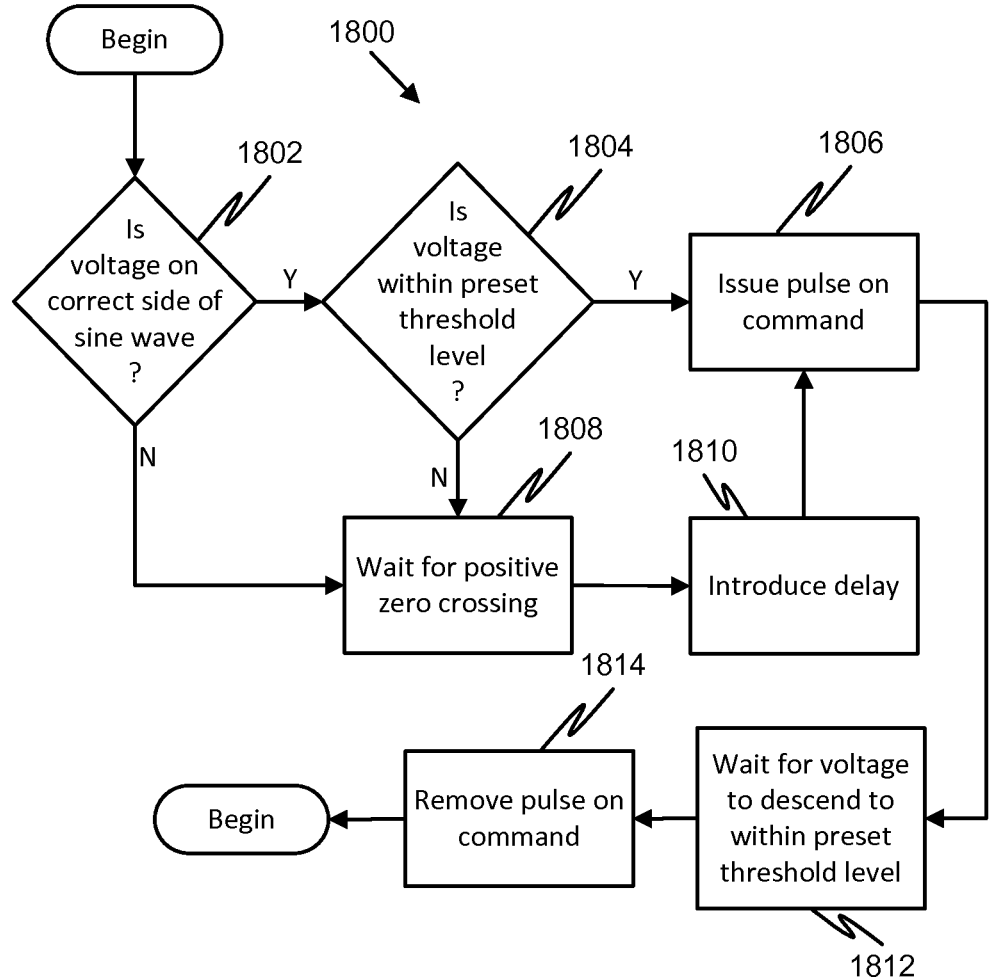
FIG. 18 is a flow diagram illustrating a method, in accordance with an example embodiment, of detecting a zero crossing.

FIG. 18 is a flow diagram illustrating a method, in accordance with an example embodiment, of detecting a zero crossing. The method 1800 begins at 1802, where it is determined if the voltage is currently on the correct side of the sine wave. In an example embodiment, this may be a positive voltage, but as described earlier there may be embodiments where negative voltage is the desired voltage and the negative voltage side may be the "correct side". If the voltage is currently on the correct side of the sine wave, then, at 1804, it is determined if the voltage is within 10% of a descending zero crossing. Of course, the particular threshold level can vary from embodiment to embodiment. If the voltage is within 10% of a descending zero crossing, then a pulse on command may be generated at 1806. If not, or if, at 1802, it was determined that the voltage was not on the correct side of the sine wave, then, at 1808, the system may wait for an ascending zero crossing. Once that occurs, then, at 1810, a delay is introduced. This delay, as discussed earlier, allows the system to reduce the chances that a zero crossing erroneously detected early can cause the system to open the gate during the "wrong" voltage stage. Once the delay has passed, then the system may progress to 1806 where the pulse on command is generated.

Following this, at 1812, the system may wait for the voltage to descend to within a preset threshold level (e.g., 10% of the peak voltage). At that point, at 1814, the "pulse on" signal may be removed.

It should be noted that while the above example embodiments the conversion of AC to DC power is described, embodiments are foreseen where the system converts between two different voltages in DC systems. For example, the system may be designed to convert between 24V DC and 12V DC.

Figure 19:
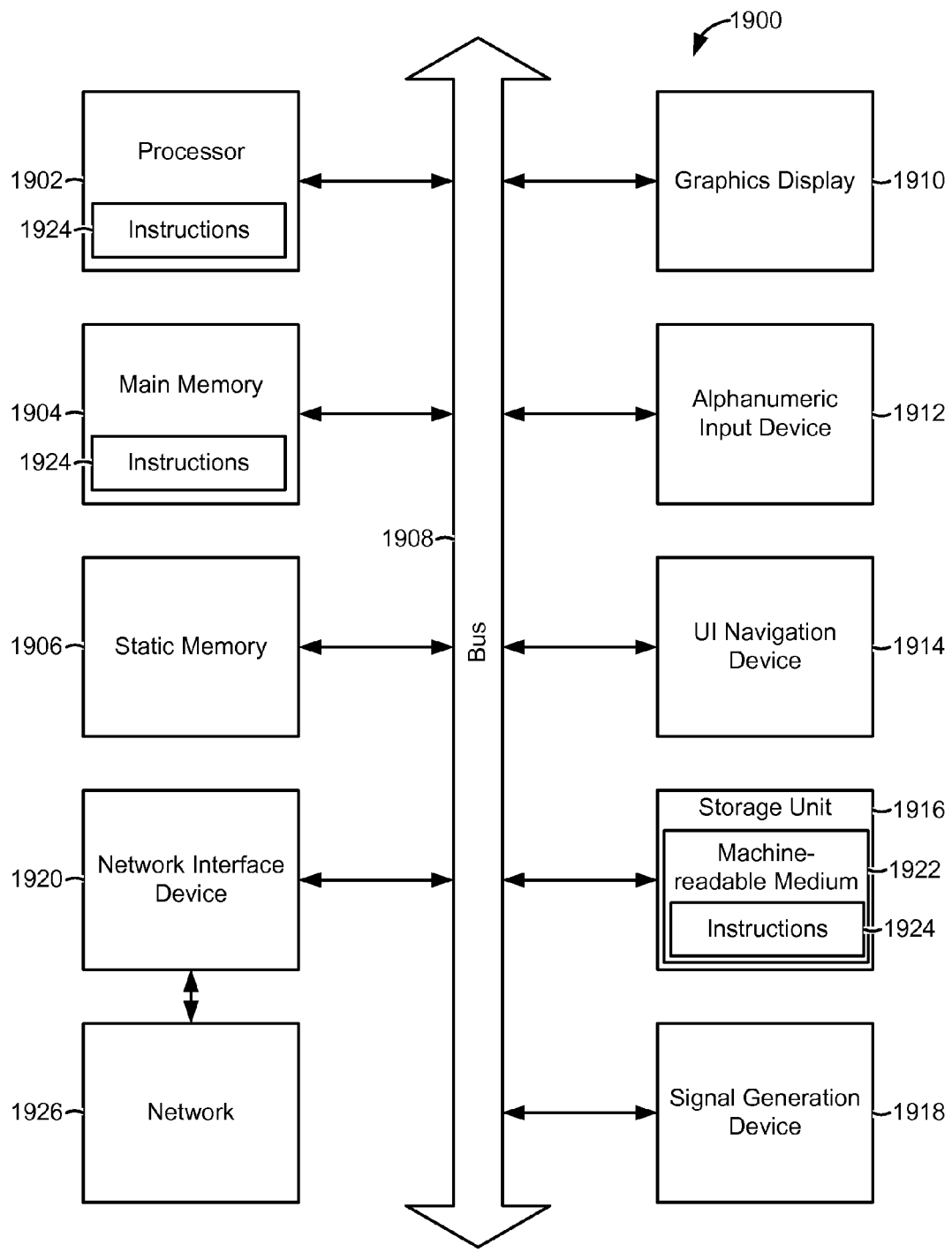
FIG. 19 is a block diagram of a computer processing system at a server system, within which a set of instructions for causing the computer to perform any one or more of the methodologies discussed herein may be executed.

It should be noted that, in some example embodiments, part of all of the gate controller may be implemented on a computer processing system. FIG. 19 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

It should be noted that while in some instances the gate controller is embodied as a hardwired hardware unit, there are other example embodiments where the gate controller is embodied as computer software run by a processor. FIG. 19 is an example of a computer processing system 1900 in which such software could operate.

The example computer processing system 1900 includes processor 1902 (e.g., a central processing unit (CPU), a graphics processing unit (GPU) or both), main memory 1904 and static memory 1906, which communicate with each other via bus 1908. The processing system 1900 may further include graphics display 1910 (e.g., a plasma display, a liquid crystal display (LCD) or a cathode ray tube (CRT)). The processing system 1900 also includes alphanumeric input device 1912 (e.g., a keyboard), a user interface (UI) navigation device 1914 (e.g., a mouse, touch screen, or the like), a storage unit 1916, a signal generation device 1918 (e.g., a speaker), and a network interface device 1920.

The storage unit 1916 includes machine-readable medium 1922 on which is stored one or more sets of data structures and instructions 1924 (e.g., software) embodying or utilized by any one or more of the methodologies or functions described herein. The instructions 1924 may also reside, completely or at least partially, within the main memory 1904 and/or within the processor 1902 during execution thereof by the processing system 1900, with the main memory 1904 and the processor 1902 also constituting computer-readable, tangible media.

The instructions 1924 may further be transmitted or received over network 1926 via a network interface device 1920 utilizing any one of a number of well-known transfer protocols (e.g., HTTP).

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions 1924. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of charging a chemical storage device, comprising:
    receiving, at a charging system, an Alternating Current (AC) voltage from an AC voltage source, wherein the AC voltage comprises a sine wave with a period and an amplitude;
    detecting a positive zero crossing, a positive zero crossing occurring when the sine wave has an amplitude of zero as it crosses from an amplitude in a first direction to an amplitude in a second direction;
    opening a gate in response to the detection of the positive zero crossing, the opening of the gate allowing the AC voltage to pass to a chemical storage device;
    detecting a negative zero crossing, a negative zero crossing occurring when the sine wave has an amplitude of zero as it crosses from an amplitude in the second direction to an amplitude in the first direction; and
    closing the gate in response to the detection of the negative zero crossing, the closing of the gate preventing any AC voltage from the AC voltage source from passing to the chemical storage device despite the charging system continuing to receive the AC voltage from the AC voltage source.

2. The method of claim 1, further comprising:
    subsequent to the opening of the gate but prior to the detecting of a negative zero crossing, closing the gate after a pulse width period expires.

3. The method of claim 2, wherein the pulse width period is constant.

4. The method of claim 2, wherein the pulse width period is variable based on detected conditions of the chemical storage device.

5. The method of claim 1, wherein the detecting a positive zero crossing includes introducing a delay wherein the opening of the gate will occur only after the delay has expired after the positive zero crossing is detected.

6. The method of claim 1, wherein the detecting a negative zero crossing includes detecting when the amplitude falls below a set threshold.

7. The method of claim 6, wherein the set threshold is a percentage of a peak amplitude.

8. The method of claim 4, wherein the detected conditions include absolute temperature.

9. The method of claim 4, wherein the detected conditions include rate of temperature change.

10. The method of claim 4, wherein the detected conditions include chemical storage device voltage.

11. The method of claim 1, wherein the method is performed without the use of a rectifier.

* * * * *